March 6, 1956 C. M. DUPONT ET AL 2,737,153
TILTABLE HOG CHUTE

Filed June 5, 1952 3 Sheets-Sheet 1

Clifton M. Dupont
Adolph J. Dupont
INVENTORS

BY *Clarence A. O'Brien*
*and Harvey B. Jacobson*
Attorneys

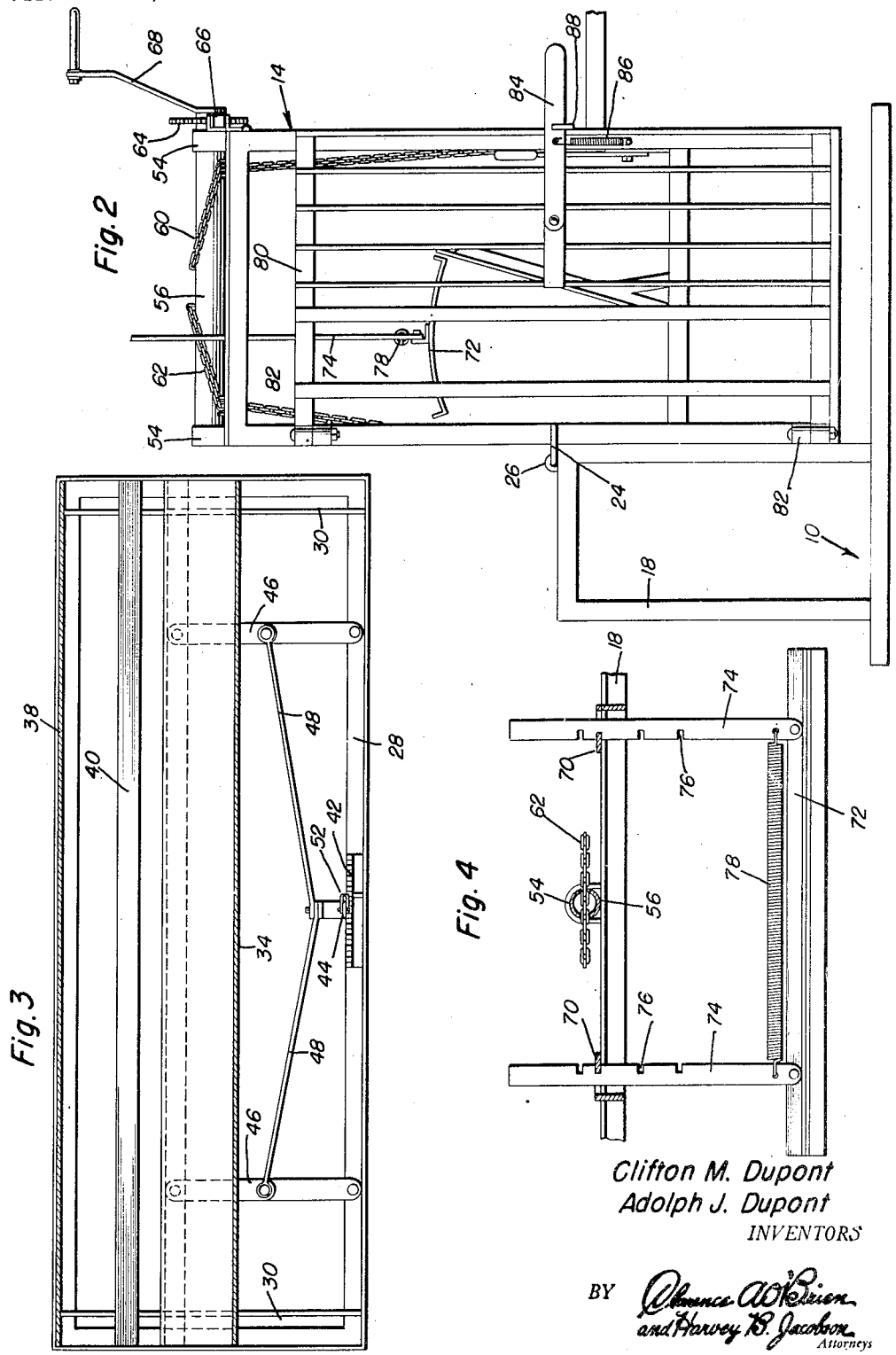

March 6, 1956 C. M. DUPONT ET AL 2,737,153
TILTABLE HOG CHUTE
Filed June 5, 1952 3 Sheets-Sheet 3
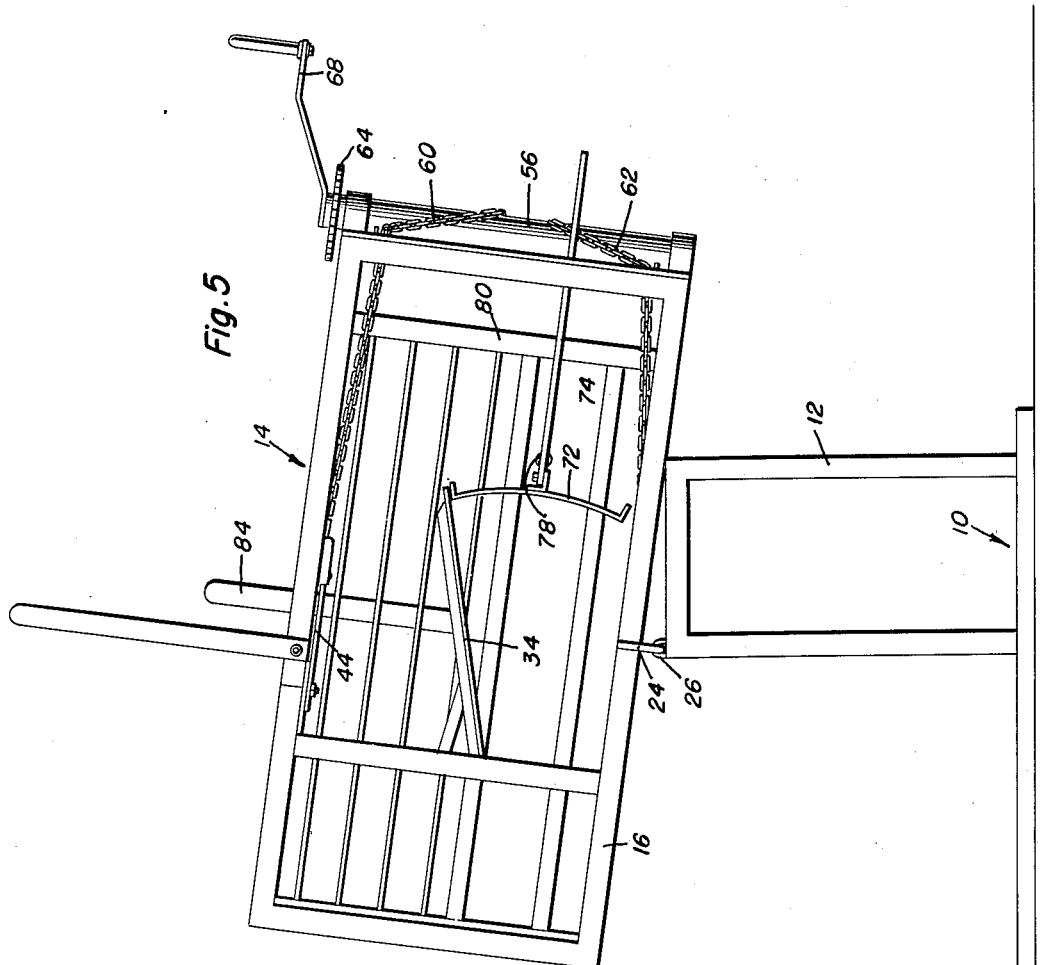
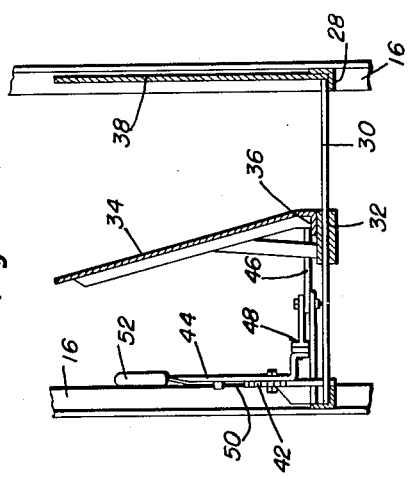
Clifton M. Dupont
Adolph J. Dupont
INVENTORS

United States Patent Office 2,737,153
Patented Mar. 6, 1956

2,737,153

TILTABLE HOG CHUTE

Clifton M. Dupont and Adolph J. Dupont, Rayne, La.

Application June 5, 1952, Serial No. 291,944

1 Claim. (Cl. 119—103)

This invention relates to new and useful improvements in apparatus for holding animals, such as hogs, as the same are treated, inspected or operated upon, and the primary object of the present invention is to provide a vertically swingable frame having means for clampingly retaining an animal thereon as the frame is moved to a vertically inclined position to provide convenient access to an animal retained thereon.

Another important object of the present invention is to provide a hog chute of the aforementioned character involving a vertically adjustable carriage that is raised after an animal steps thereon in order to lift the animal from the ground without injury to the animal.

A further object of the present invention is to provide a hog chute wherein the carriage raising and lowering means is supported on top of the frame for rigidity and is located to avoid the same coming in contact with an animal on the carriage.

A still further aim of the present invention is to provide a hog chute that is simple and practical in construction, strong and reliable in use, efficient and durable in operation, inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 2 is a rear end view of Figure 1;

Figure 3 is a horizontal sectional view of Figure 1 taken through the coacting side clamping members;

Figure 4 is a vertical sectional view taken substantially on the plane of section line 4—4 of Figure 1;

Figure 5 is a front end view of Figure 1, showing the frame supported in a vertically inclined position; and, Figure 6 is a fragmentary vertical sectional view taken substantially on the plane of section line 6—6 of Figure 1.

Figure 1:
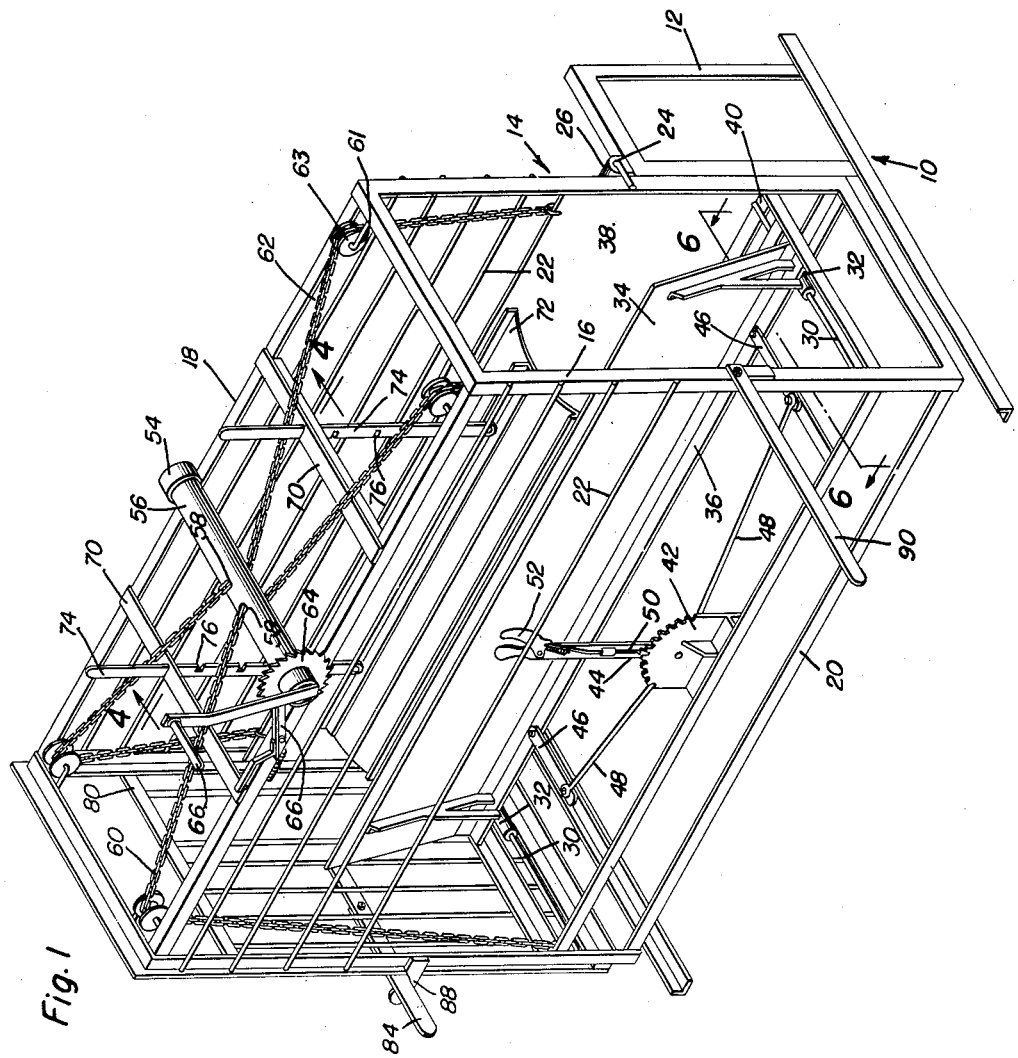
Figure 1 is a perspective view of the present invention.

Referring now to the drawings in detail, wherein for the purpose of illustration, there is disclosed a preferred embodiment of the present invention, the numeral 10 represents a rigid base including a pair of upstanding inverted U-shaped end members 12.

A frame 14 is mounted on the end members 12 for vertical swinging movement. Frame 14 is composed of a pair of rectangular angle iron and members 16 whose upper and lower corners are connected to each other by angle iron bars 18 and 20 respectively. The longer sides of the end members 16 are connected by spaced parallel rods 22 to prevent the escape of an animal confined within the frame.

Trunnions 24 are fixed to the end members 16 and include horizontal portions that extend into bearing elements 26 fixed to the upper portions of the base end members 12 to constitute the means pivotally mounting the frame on the base.

An open substantially rectangular carriage 28 is slidably carried by the frame 14 and the flanges of the longer sides of the end members 16 face each other to slidably receive the corners of the carriage 28. A pair of transverse, spaced parallel guide rods 30 are fixed to the carriage 28 and slidably support sleeves 32 that are fixed to an inclined pressure member or clamping plate 34 having a flanged portion 36 whose ends overlie the horizontal flanges of the transverse portions of carriage 28.

A vertical wall or plate 38 is fixed to the carriage and opposes the member 34. A longitudinally extending straddle bar 40 is terminally fixed to the ends of the carriage 28 and is located between the member 34 and the plate 38.

Means is provided for selectively moving the member 34 toward and away from the plate 38. This means comprises a rack or arcuately toothed plate 42 that is fixed to the carriage medially the ends of the carriage. A lever 44 is pivoted to the center of plate 42 and lever 44 is connected to swingable links 46 on the member 34 by pitmans 48. A spring urged locking dog 50 slidably carried by the lever will engage between selected adjacent teeth of plate 42 and a hand grip 52 pivoted to the lever and the dog constitutes means for retracting the dog from its locking position.

The angle iron bars 18 support bearings 54 that rotatably support a tubular member 56 having a pair of transverse apertures 58. Chains 60 and 62 extend through the apertures 58 and are terminally attached to the end of carriage 28 and the upper portion of the wall 38. The ends of the bars 18 carry brackets 61 for rollers 63 over which the chains extend from the member 56.

A ratchet 64 is fixed to the member 56 and is engaged by a spring urged pivoted dog or pawl 66 on one of the bars 18, to retain the member 56 in a selected rotated position. A handle 68 fixed to one end of member 56 to permit rotation of the member 56 and winding of the chains 60, 62 about member 56 as the carriage is raised.

A pair of transverse, spaced parallel straps 70 are fixed to the bars 18 and removably and adjustably support a concavo-convex confiner plate 72. A pair of vertically swingable arms 74 are pivoted to the plate 72 and their inner edges are formed with vertically spaced notches 76 for receiving the straps 70. The arms 74 are connected by a coil spring 78 that urge the arms 74 together and against the straps 70.

A gate or closure 80 is hinged, as at 82, to one of the end members 12 and pivotally supports a latch 84 that is urged by a spring 86 into a recess in a keeper arm 88 fixed to the said one of the end members 12.

In practical use of the present invention, the frame 14 will be disposed in a vertical position and the carriage lowered as a hog is moved into the front open end of the frame. The bar 40 will be located between the forward legs and the rear legs of the hog. The hog is held in this position between the member 34 and wall 38 as the carriage is raised.

Then the frame is rocked on trunnions 24 by a handle 90 fixed to the frame until the frame is supported in a vertically inclined position upon the members 12. The plate 72 will coact with member 34 and wall 38 in retaining a hog in the frame and plate 72 and member 34 are adjustable on the frame to accommodate hogs of different sizes.

Having described the invention, what is claimed as new is:

A hog chute comprising a base, an open frame member pivotally mounted on the base for vertical swinging movement, a vertically movable carriage slidably carried by the farme, means attached to the carriage and supported on the frame for selectively raising and lowering the carriage, said carriage including a vertical wall, a horizontally movable pressure member slidably carried by the carriage and movable toward and away from the wall, means on the carriage and connected to the pressure member for sliding the latter selectively toward and away from said wall, and a vertically adjustable pressure member carried by the frame and coacting with the wall and the first named pressure member in retaining a hog on the carriage, said vertically adjustable pressure member includes a concavo-convex plate, a pair of spring connected arms pivotally attached to the concavo-convex plate and extending upwardly therefrom, said arms including opposed edges having longitudinally spaced notches therein, and a pair of bars fixed to said frame for entering selected notches in the arms.

References Cited in the file of this patent

UNITED STATES PATENTS

| | | |
|---|---|---|
| 1,186,828 | Pfander | June 13, 1916 |
| 1,621,760 | Stader et al. | Mar. 22, 1927 |
| 1,788,924 | Marrinan et al. | Jan. 13, 1931 |
| 2,446,769 | Keirsey | Aug. 10, 1948 |
| 2,616,392 | Hutchings | Nov. 4, 1952 |
| 2,630,099 | Voigt | Mar. 3, 1953 |
| 2,660,982 | Linton | Dec. 1, 1953 |